CIRCUIT ARRANGEMENT FOR THE COUNTING STAGES OF A RING COUNTER

Filed April 13, 1962 2 Sheets-Sheet 1

INVENTOR
OLE JOHAN MELHUS

BY Philip M. Bolton

ATTORNEY

CIRCUIT ARRANGEMENT FOR THE COUNTING STAGES OF A RING COUNTER

Filed April 13, 1962 2 Sheets-Sheet 2

INVENTOR
OLE JOHAN MELHUS

BY Philip M. Bolton

ATTORNEY

United States Patent Office

3,181,006
Patented Apr. 27, 1965

3,181,006
CIRCUIT ARRANGEMENT FOR THE COUNTING STAGES OF A RING COUNTER

Ole Johan Melhus, Ludwigsburg, Germany, assignor to International Standard Electric Corporation, New York, N.Y., a corporation of Delaware Filed Apr. 13, 1962, Ser. No. 187,268
Claims priority, application Germany, Apr. 28, 1961, St 17,748
3 Claims. (Cl. 307—88.5)

The present invention relates to a circuit arrangement for ring counters and more particularly to ring counters using tunnel diodes.

Counting circuits employing tunnel diodes are already known, which operate on a three-step principle.

For example, in a three-step method a stepping-on of the counter in a certain direction is achieved by setting the bistable element during the first step, having this stored position of the counter stepped-on during the second step, and re-setting the bistable element during a third step.

It is also possible to use only two steps, if the stepping direction is determined by inserting diodes between the individual stages. During the first step the bistable element is set, and during the second step the position of the counter is stepped-on and, simultaneously, a re-setting of the bistable element is effected.

The first conventional type of solution, namely the three-step method, has the disadvantage that the maximum counting speed is reduced by the necessary three steps, and that additional expenditure is required for producing these different stepping or clock-pulse signals. In the hitherto conventional types of embodiments of the two-step method, the clock-pulse signals simultaneously serve as the supply voltages for the tunnel diode stages, so that in the case of many stages, a very high output is required from the master clock (clock-pulse generator). Since, at the same time, there are required good switching properties as well as short duration periods, these clock-pulse signals must have good leading and trailing edges, the production of which, in the case of relatively high outputs, is difficult.

It is one object of the present invention to avoid the forementioned disadvantages; accordingly, there is provided a circuit arrangement for the counting stages of a ring counter achieving high switching speeds at a low expenditure and at a low power consumption with respect to the clock-pulses.

The circuit arrangement according to the invention is characterised by the fact that a bistable circuit is provided, whose output which is marked in the case of a stored "1," is connected via a time-delay circuit, to the first input of an AND-gate, the second input of said AND-gate being connected to the counting clock-pulse line; the output of said AND-gate is connected to the second input (0) of the bistable stage and also to the first input (1′) of the bistable stage of the next successive counting stage.

Further embodiments of the subject matter of the invention relate to the employment of tunnel diodes for acting as the switching elements for bistable, monostable and AND-circuits. Details relating thereto may be taken from the description of the drawings as given hereinafter, as well as from the sub-claims.

Figure 1:
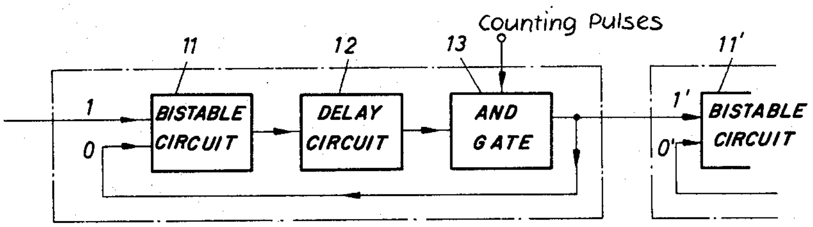
Figure 2:
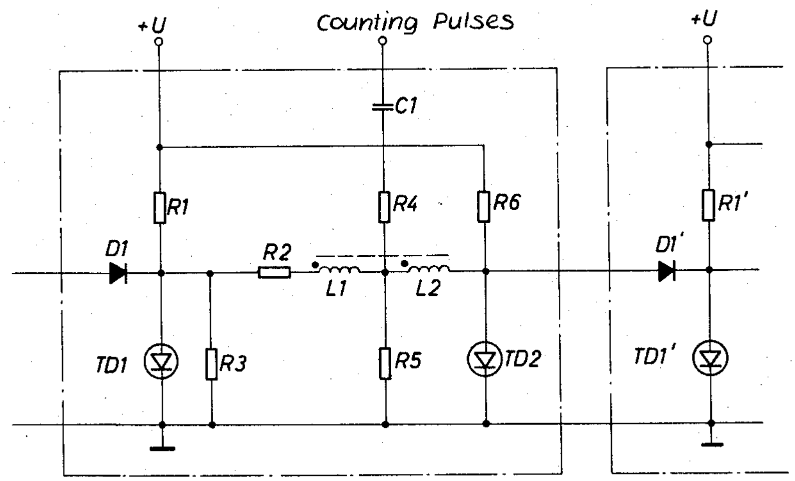
Figure 3:
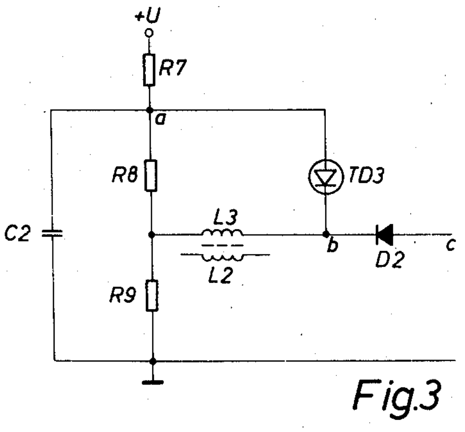
Figures 4, 5:
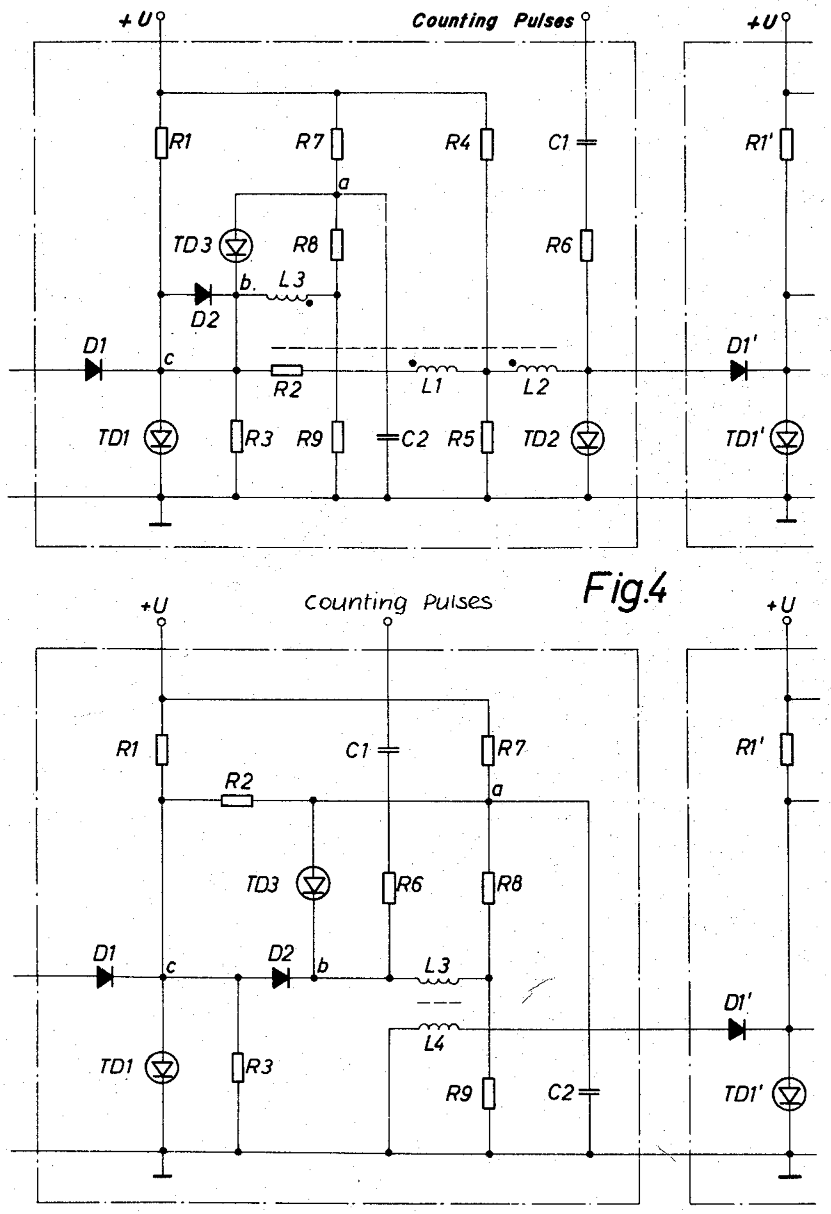

The invention will now be explained in detail with reference to exemplified embodiments shown in FIGS. 1–5 of the accompanying drawings, in which:

FIG. 1 shows the block diagram of an inventive type of circuit arrangement for counting stages, FIG. 2 shows one type of embodiment of the inventive type of circuit arrangement using tunnel diodes and an inductive time-delay circuit, FIG. 3 shows a monostable trigger circuit comprising a tunnel diode as is used in the embodiment according to FIG. 4, FIG. 4 shows a further embodiment of the type of inductive time-delay circuit according to FIG. 3 in the reset circuit, and FIG. 5 shows an embodiment comprising a capacitive time-delay circuit using the monostable trigger circuit as shown in FIG. 3 as an AND-circuit.

For the purpose of storing the information there is provided a bistable circuit 11 (FIG. 1). For example, if a "1" is stored, then the marking "1" will appear at the output of this stage. This state is transferred to the first input of an AND-circuit 13 via a delay circuit 12. The counting pulse is applied to the second input of this AND-circuit.

If there appears at the first input of the AND-circuit 13, a marking "1," then an output signal will appear at the output of this AND-circuit if a counting pulse appears at the second input. This output pulse is applied to the lower input lead 0 of the bistable stage 11, for resetting this stage to "0." This is possible, because the initial state "1" of the bistable stage 11 is stored by the delay circuit 12 during the stepping time. At the same time the delay circuit prevents a stepping-on of more than one stage from being performed during one counting pulse. Together therewith, the output pulse of the AND-circuit 13 which, at the same time, is the output pulse of the entire counting stage, is fed to the upper input lead 1′ of the bistable stage 11′ of the next counting stage, so that into this stage is stored a "1." Accordingly, there is effected a stepping-on of the counter by one counting stage per counting pulse.

In FIG. 2 the tunnel diode $TD_1$ operating in the bistable condition, acts like a storage device. This tunnel diode is correspondingly biased by a source of voltage U via the resistors $R_1$ and $R_3$, so that it is capable of assuming two stable states. One of these states exists at a high current and a low voltage drop of the tunnel diode, and is referred to as the state "0," whereas the second stable point exists at a low current and a high voltage drop at the tunnel diode, and is referred to as the state "1."

Assuming now that the tunnel diode $TD_1$ is in its state "0." Therefore only a very small current will flow via the resistor $R_2$ to the second tunnel diode $TD_2$ operating in a monostable condition, resulting in this tunnel diode remaining in the state "0." The amplitude of the counting pulse is so dimensioned that it alone is incapable of switching the tunnel diode $TD_2$ operating in a monostable condition, into the state "1."

If now, via the diode $D_1$, a positive pulse is applied to the bistable tunnel diode $TD_1$, this tunnel diode is reversed into the state "1," and the voltage dropping off across the tunnel diode is high. A current increasing in accordance with an *e*-function will then flow via the resistor $R_2$, the inductance $L_1$ and the resistor $R_5$, with the time constant thereof being dependent upon $R_2$, $L_1$ and $R_5$. On account of this the monostable tunnel diode $TD_2$ is controlled, but this amplitude alone is still incapable of effecting the switching. The monostable tunnel diode $TD_2$ acting as an AND-circuit, is only switched into the state "1" after the next counting pulse has been added thereto. Upon switching of the tunnel diode $TD_2$ a positive pulse is transmitted triggering the bistable stage together with the tunnel diode $TD_1'$ of the next counting stage into the state "1." At the same time, by the inductive coupling between $L_1$ and $L_2$ and a phase shift, the tunnel diode is also reset to the state "0" by the action of a negative pulse. Accordingly, the stepping-on of the counter has been effected by one stage.

The inductances $L_1$ and $L_2$ are wound onto a common ferrite core. The counting frequency of the circuit arrangement depends on $L_1$ and $L_2$, because these inductances determine the time constant of the delay circuit. In addition thereto, the stationary conditions must be re-established during the time between the counting pulses. $L_1$ and $L_2$, however, cannot be diminished at will, because this causes a relative deterioration of the magnetic coupling. On account of this, and because of small values of $L_1$ and $L_2$, the bistable circuit with the tunnel diode is not unobjectionably reset to the state "0."

In order to achieve higher counting frequencies, a third tunnel diode $TD_3$ has been inserted in a monostable arrangement (see FIGS. 3 and 4).

The monostable tunnel diode circuit as shown in FIG. 3 has been specially designed for the application in which the reset signal is amplified. Via the inductive coupling between the windings $L_2$ and $L_3$ this reset pulse is applied to the tunnel diode $TD_3$. The positive electrode (point $a$) is blocked off to mass via the capacitor $C_2$. The adjustment of the operating point is effected with the aid of the resistors $R_7$, $R_8$ and $R_9$, with $R_9$ simultaneously raising the potential of the tunnel diode so that the rest voltage at point $b$ will be lying somewhat below the valley voltage of the tunnel diode $TD_3$. If now the tunnel diode $TD_3$ is triggered by an input pulse, a negative pulse will be obtained at point $b$.

FIG. 4 shows a counting stage which is somewhat modified with respect to that shown in FIG. 2, into which the monostable trigger circuit as described with reference to FIG. 3, is additionally inserted together with the tunnel diode $TD_3$. Accordingly, if a negative pulse appears at the point $b$, then the diode $D_2$ is unblocked and the bistable tunnel diode $TD_1$ is reliably reset on account of this.

The monostable arrangement according to FIG. 3 may also be laid out as an AND-circuit. In this case the circuit is controlled via a resistor $R_2$ at point $a$ by the bistable tunnel diode $TD_1$ (see FIG. 5). In connection with the capacitor $C_2$ this resistor $R_2$ acts as a capacitive delay circuit. The counting pulse is applied at pont $b$. If the bistable stage comprising the tunnel diode $TD_1$ is in its state "0," then a current will flow from $a$ to $c$ via $R_2$, to the tunnel diode $TD_3$, thus reducing the biasing potential of the tunnel diode $TD_3$. A negative counting pulse at the point $b$ does not yet reverse the tunnel diode $TD_3$. However, if the tunnel diode $TD_1$ is in the state "1," then only a small current will flow to the tunnel diode $TD_3$ via $R_2$, on account of which the biasing potential of the tunnel diode, which is determined by the voltage-dividing resistors $R_7$, $R_8$ and $R_9$, will remain as it is. If now a negative counting pulse appears at the point $b$, there is effected a reversal of the prepared monostable tunnel diode $TD_3$. In this case a negative pulse will appear at point $b$ which, via the diode $D_2$, resets the bistable tunnel diode $TD_1$. The output pulse is inductively transferred to the next stage via the transformer $L_3$ to $L_4$.

Of course, it is also possible to employ all tunnel diodes and diodes in inverse polarity, on account of which there will also be reversed the necessary polarity of the control pulses as well as of the supply voltage.

While I have described above the principle of my invention in connection with specific apparatus, it is to be clearly understood that this description is made only by way of example and not as a limitation to the scope of my invention as set forth in the objects thereof and in the accompanying claims.

What I claim is:

1. A circuit arrangement for the counting stages of a ring counter including a bistable stage comprising a first tunnel diode whose output taken at the anode is coupled inductively via an RL time-delay circuit to the anode of a second tunnel diode operating in a monostable condition as an AND-gate, a counting clock-pulse line also coupled to the anode of said second tunnel diode, wherein the output of said AND-gate is coupled via inductance to the anode of said first tunnel diode to reset it and via a diode having a polarity permitting passage of positive pulses to the anode of a tunnel diode comprising the bistable stage of the next successive counting stage.

2. A circuit arrangement in accordance with claim 1 wherein said anode of said second tunnel diode acting as an AND-gate is inductively coupled to the cathode of a third tunnel diode operating in a monostable condition, with the anode of said third tunnel diode coupled to ground through a capacitor, and the output of said monostable stage taken at the cathode of said third tunnel diode is applied to the anode of said first tunnel diode, through a diode polarized to admit negative pulses, for resetting said first tunnel diode.

3. A circuit arrangement for the counting stages of a ring counter including a bistable circuit coupled via a time-delay circuit to the first input of an AND-gate, the second input of said AND-gate being coupled to a source of counting pulses, with the output of said AND-gate coupled to the second of two inputs of said bistable stage and also to the bistable stage of the next successive counting stage, wherein said bistable stage includes a first tunnel diode whose output taken at the anode is coupled via an RC time-delay to the anode of the second tunnel diode acting as an AND-gate and operating in a monostable condition, with the cathode of said second tunnel diode coupled to said source of counting pulses, the output of said second tunnel diode AND-gate taken at the cathode is coupled through a diode polarized to pass negative pulses, to the anode of said first tunnel diode for resetting thereof and also said output is transformer coupled through a diode polarized to pass positive pulses to the anode of the first tunnel diode of the next successive stage operating in a bistable condition.

References Cited by the Examiner

UNITED STATES PATENTS

| | | | |
|---|---|---|---|
| 2,748,269 | 5/56 | Slutz | 307—88.5 |
| 2,858,429 | 10/58 | Heywood | 328—94 X |

OTHER REFERENCES

McGuire, "IBM Technical Disclosure Bulletin," vol. 3, No. 9, February 1961.

GE Tunnel Diode Manual, March 20, 1961, pages 56, 57, Figure 6.2.

Hilsenrath, IBM Technical Disclosure Bulletin, vol. 4, No. 7, December 1961, page 56.

ARTHUR GAUSS, *Primary Examiner.*